US009420031B2

(12) United States Patent
Zhao (10) Patent No.: US 9,420,031 B2
(45) Date of Patent: Aug. 16, 2016

(54) SYSTEMS AND METHODS FOR BUILDING AND USING HYBRID MOBILE APPLICATIONS (71) Applicant: Microsoft Corporation, Redmond, WA (US)

(72) Inventor: Keping Zhao, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 146 days.

(21) Appl. No.: 13/742,130

(22) Filed: Jan. 15, 2013

(65) Prior Publication Data

US 2014/0201328 A1 Jul. 17, 2014

(51) Int. Cl.
*G06F 15/16* (2006.01)
*H04L 29/08* (2006.01)
*H04W 4/00* (2009.01)

(52) U.S. Cl.
CPC .............. *H04L 67/025* (2013.01); *H04L 67/02* (2013.01); *H04L 67/34* (2013.01); *H04W 4/003* (2013.01); *H04W 4/001* (2013.01)

(58) Field of Classification Search
CPC ..... H04L 67/025; H04L 67/04; H04W 4/003; G06F 17/24; G06F 9/541
USPC .......................... 709/219, 203, 217; 455/418
See application file for complete search history.

(56) References Cited

U.S. PATENT DOCUMENTS

| | | | | |
|---|---|---|---|---|
| 6,473,800 B1* | 10/2002 | Jerger et al. | .................... | 709/226 |
| 7,000,221 B2* | 2/2006 | Bhogal et al. | ................. | 717/115 |
| 7,636,888 B2* | 12/2009 | Campbell et al. | ............ | 715/708 |
| 8,359,010 B2* | 1/2013 | Lopez et al. | ................... | 455/411 |
| 8,554,190 B2* | 10/2013 | Smith et al. | .................... | 455/418 |
| 8,572,603 B2* | 10/2013 | Bansod et al. | ................ | 717/177 |
| 8,635,701 B2* | 1/2014 | Hilaiel et al. | .................... | 726/25 |
| 8,819,698 B2* | 8/2014 | Sandholm et al. | ............ | 719/310 |
| 2006/0129972 A1* | 6/2006 | Tyburski et al. | ............. | 717/106 |
| 2006/0248160 A1* | 11/2006 | Plummer | ...................... | 709/217 |
| 2008/0127037 A1* | 5/2008 | Kadur et al. | ................... | 717/100 |
| 2008/0177994 A1* | 7/2008 | Mayer | ............................... | 713/2 |
| 2009/0106803 A1* | 4/2009 | Chen et al. | .................... | 725/103 |
| 2009/0222925 A1* | 9/2009 | Hilaiel et al. | .................... | 726/25 |
| 2010/0268848 A1* | 10/2010 | Maurya et al. | ................ | 709/246 |
| 2010/0269048 A1* | 10/2010 | Pahlavan et al. | .............. | 715/740 |
| 2012/0166643 A1* | 6/2012 | Smith | ........................... | 709/225 |

(Continued)

OTHER PUBLICATIONS

"International Search Report & Written Opinion for PCT Patent Application No. PCT/US2014/011367", Mailed Date: Jun. 12, 2014, Filed Date: Jan. 14, 2014, 10 Pages.

(Continued)

*Primary Examiner* — El Hadji Sall (74) *Attorney, Agent, or Firm* — Bryan Webster; Judy Yee; Micky Minhas (57) ABSTRACT

Systems and techniques of building and presenting hybrid remote client applications for and to users of a mobile device are presented. Upon a user accessing a remote client application, the mobile device may launch a unified User Interface (UI) that provides the user with a list of allowable operations associated with the remote client application. Such allowable operations may include JavaScript operations that are supplied by the remote client application—e.g., via a HTML web page. In addition, an allowable operation may include a native operation that is supplied by the native SDK of the mobile device.

20 Claims, 6 Drawing Sheets

(56) References Cited

U.S. PATENT DOCUMENTS

| | | | | |
|---|---|---|---|---|
| 2012/0198483 A1* | 8/2012 | Jin et al. | ............... | 719/330 |
| 2012/0220263 A1* | 8/2012 | Smith et al. | ............... | 455/410 |
| 2012/0254290 A1* | 10/2012 | Naaman | ............... | 709/203 |
| 2012/0254722 A1 | 10/2012 | Newton | | |
| 2012/0278185 A1 | 11/2012 | Ramachandran | | |
| 2012/0317172 A1* | 12/2012 | Redpath | ............... | 709/203 |
| 2013/0060886 A1* | 3/2013 | Wynn et al. | ............... | 709/217 |
| 2013/0110979 A1* | 5/2013 | Zhu et al. | ............... | 709/219 |
| 2014/0023375 A1* | 1/2014 | Gilson et al. | ............... | 398/106 |

OTHER PUBLICATIONS

An Introduction to Cross-Platform Mobile Development Technologies—Published Date: May 21, 2012 Author: Robert Chipperfield http://www.codeproject.com/Articles/388811/An-introduction-to-cross-platform-mobile-developme.

Technical Overview—Native Client—Google Developer—Retrieved Date: Dec. 19, 2012 https://developers.google.com/native-client/overview.

Thoughts on HTML5 based mobile apps—Published Date: Jul. 1, 2012 Author: Neil Goodman http://neilgoodman.net/2012/07/01/thoughts-on-html5-based-mobile-apps/.

Developing Hybrid Apps with the Salesforce Mobile SDK—Retrieved Date: Dec. 19, 2012 Author: Pat Patterson http://wiki.developerforce.com/page/Developing_Hybrid_Apps_with_the_Salesforce_Mobile_SDK.

The Spectrum of Hybrid Mobile App Development with Worklight—Published Date: Apr. 29, 2012 Author: Bob Sutor http://www.sutor.com/c/2012/04/spectrum-hybrid-mobile-app-development-worklight/.

Mobile and the Salesforce Mobile SDK—Retrieved Date: Dec. 19, 2012 http://wiki.developerforce.com/page/Mobile_SDK.

Cross Platform Mobile Application Development—Published Date: Jul. 21, 2012 Author: Pramod http://www.lightrains.com/blog/cross-platform-mobile-application-development.

Cross Platform Mobile Development—Published Date: Dec. 12, 2012 Author: Varghese Kiran http://www.qburst.com/blog/2012/12/cross-platform-mobile-development/.

PCT Application No. PCT/US2014/011367 (Foreign counterpart application to U.S. Appl. No. 13/742,130), Article 34 Demand, Letter and Amendments dated Sep. 15, 2014, 15 pages.

PCT Application No. PCT/US2014/011367 (Foreign counterpart application to U.S. Appl. No. 13/742,130), Second Written Opinion dated Nov. 28, 2014, 6 pages.

PCT Application No. PCT/US2014/011367 (Foreign counterpart application to U.S. Appl. No. 13/742,130), Communication in Response to Second Written Opinion, dated Jan. 28, 201, 11 pages.

European Patent Application No. 1470396.5 (Foreign counterpart application to U.S. Appl. No. 13/742,130), Communication dated Aug. 21, 2015, 2 pages.

European Patent Application No. 1470396.5 (Foreign counterpart application to U.S. Appl. No. 13/742,130), Response to Communication, dated Feb. 29, 2016, 16 pages.

\* cited by examiner

SYSTEMS AND METHODS FOR BUILDING AND USING HYBRID MOBILE APPLICATIONS

BACKGROUND

In the area of building client applications for mobile and/or other computing platforms, there are currently two main options to build a client applications: (1) using HTML+JavaScript; or (2) use the client-specific native Software Development Kit (SDK).

One possible advantage to using a HTML approach is that it is basically a write-once, run-anywhere (i.e., any platform) solution and is fairly easy to update. However, on some platforms, and especially mobile platforms, there may be some limitations to access the local resources—e.g., local album and contact list, which may be undesirable when trying to build pure HTML apps (e.g., Microsoft SkyDrive® storage apps).

On the other hand, one possible advantage to using a native SDK approach is that the app may make use of most the resources locally on the platform. However, this approach may not be scalable across different platforms—e.g., each platform normally has a different SDK and it may be necessary to develop different versions for a single app.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Systems and techniques of building and presenting hybrid remote client applications for and to users of a mobile device are presented. Upon a user accessing a remote client application, the mobile device may launch a unified User Interface (UI) that provides the user with a list of allowable operations associated with the remote client application. Such allowable operations may include JavaScript operations that are supplied by the remote client application—e.g., via a HTML web page. In addition, an allowable operation may include a native operation that is implemented using the native SDK of the mobile device.

In one embodiment, a system is provided that comprises a processor; a communications module which is capable of communicating with remote client applications; an application controller which is capable of being executed by said processor and where said application controller may also be capable of communicating with remote client applications via said communications module. The application controller may also be capable of querying said remote client application if said remote client application comprises at least one native operation.

In other embodiment, a method is provided for executing a hybrid mobile application upon a mobile device which capable of executing native operations created from said mobile devices native SDK, the steps of said method comprising: upon a user initiation of a mobile application, loading an application controller, said application controller capable of providing a User Interface (UI) for said user that allows access to remote client application functionality and native operation.

In another embodiment, a method is disclosed that provides a User Interface (UI) to a user of a mobile device. The UI allows the user to access functionality associated with a remote client application, the steps of said method comprising: providing a UI to said user, said UI further comprising buttons for actuating operations associated with said remote client application; and upon user selection, invoking one of said operations associated with said remote client application wherein said operations further comprises one of a group, said group comprising: remote operations executed by said remote client application and native operations executed by said mobile device.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

As previously mentioned, conventional client applications built using hypertext markup language (HTML) and JavaScript may have limitations while accessing platform specific resources. However, building client applications using software development kit (SDK) may have the problem of platform dependency.

Many embodiments of the present application disclose systems and methods that provide a hybrid approach to building and/or using applications using HTML and the native SDK. In at least one of present embodiment, systems and methods may: (a) allow the application to access platform specific resources; (b) include a unified UI experience that provides operations implemented both in the Native SDK and the JavaScript; and/or (c) allow HTML to contain information about the provided operations and parameters of these operations.

Figure 1:
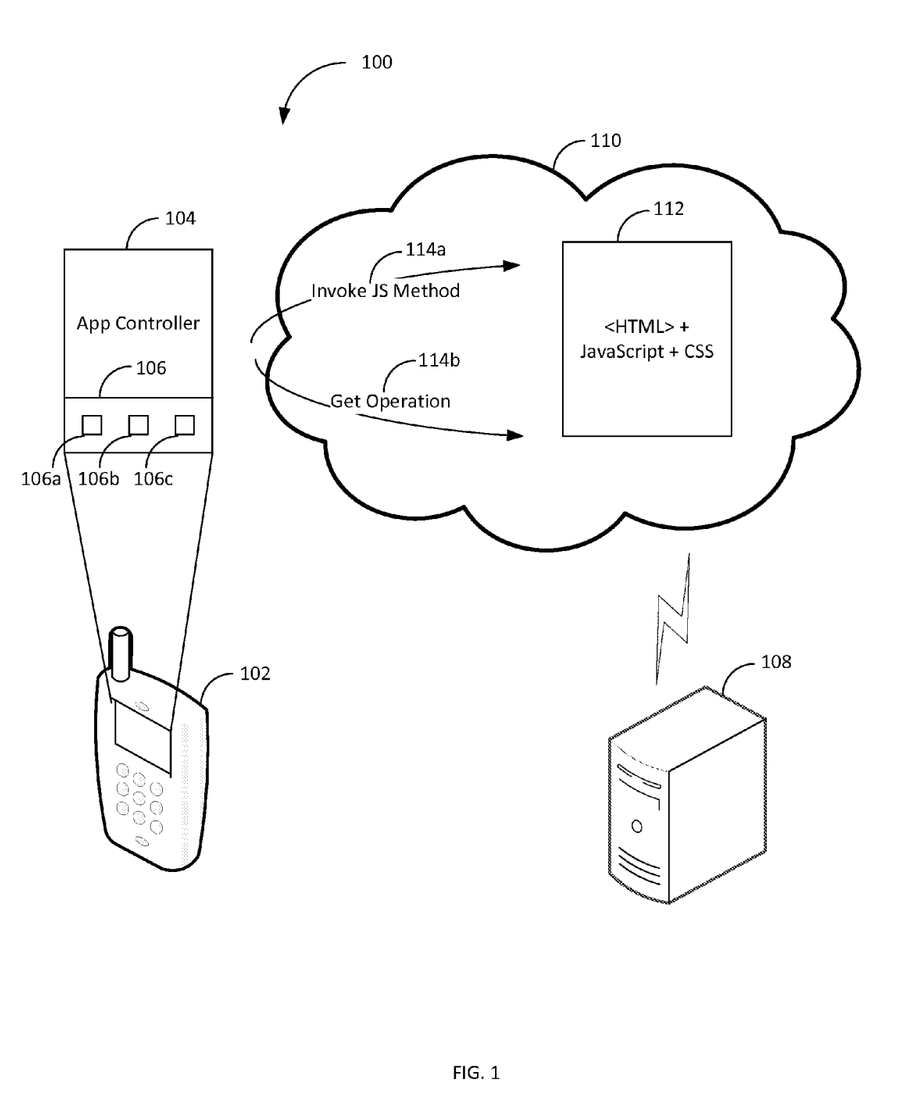
FIG. 1 depicts one embodiment of system for using a hybrid mobile application, as made in accordance with the principles of the present application.

FIG. 1 depicts one embodiment of a system and/or method of the present application as it may operate in a general environment 100. Mobile device 102 may be one of any number of devices (e.g., laptop, tablet, smart phone, etc. and the like) generally comprises a processor, memory, communication modules (e.g. wireless and/or wired) and an operating system. In today's mobile space, there are a number of different, competing operating systems from which users may select.

Oftentimes, application developers (working on, e.g., servers 108) may build mobile and/or client applications 112 and put them onto the Internet 110 (and/or other channels of commerce/communications) to be accessible to mobile device users. Application 112 may be constructed using HTML, JavaScript and CSS, as is known in the art. As mentioned, however, such applications may not be able to access the full range of local resources on the mobile device itself and, thus, may not be a powerful for the user as possible.

Application Controller 104 may be presented to the mobile user as a unified (and/or unitary) User Interface (UI) to allow application 112 to access local resources via an operations container 106. Operations container may comprise operations buttons (e.g. 106*a*, 106*b*, 106*c*) that allow the user to launch operations associated with the application. Operations container 106 may be implemented to appear, e.g., as a toolbar or the like to the user.

As depicted in FIG. 1, as the user is interacting with the mobile application 112, the app controller 104 may employ one of plurality of ways to access the functionality of the application—either (1) invoking JavaScript on the HTML page (114*a*) or (2) invoking an operation implemented in the native SDK, as discussed in greater detail herein. The choice as to which way to access the application may be transparent to the user. As disclosed herein, a "GetOperation" call (e.g., to invoke an operation implemented in the native SDK) may be a way in which the mobile application may operate, function and/or behave more as native operation to the mobile device. Action 114*b* may occur when the HTML page has loaded and the app controller may call GetOperation to retrieve the list of operations supported. In one embodiment, the present system may build a mobile app by using both of the HTML of the mobile application (that may be remotely accessed) and native SDK of the mobile device. Such a system tends to combine the power of both HTML and native SDK.

In this embodiment, the main content view (that may be provided in the App Controller) may be the HTML+JavaScript (called the "HTML part" of the app), and operations hosted in the App Controller (called the "native part" of the app). Operations may be a combination of the actual functionality logic (i.e., implemented either in JavaScript or in native SDK) and the UI elements (e.g., the buttons in the Operations Container) to access the logic.

The UI shown to the user in the App Controller may provide a unified UI (e.g. menu or tool bar, called "Operation Container") for the operations that users may do on that page. In one embodiment, the Operation Container may comprise control implemented by native SDK (and thus it may invoke other logic implemented by native SDK). For example, the operations may be the logic implemented in native SDK that can access the resources not accessible by JavaScript. Alternatively, it may be the logic implemented by JavaScript hosted in the App Controller.

Figure 2:
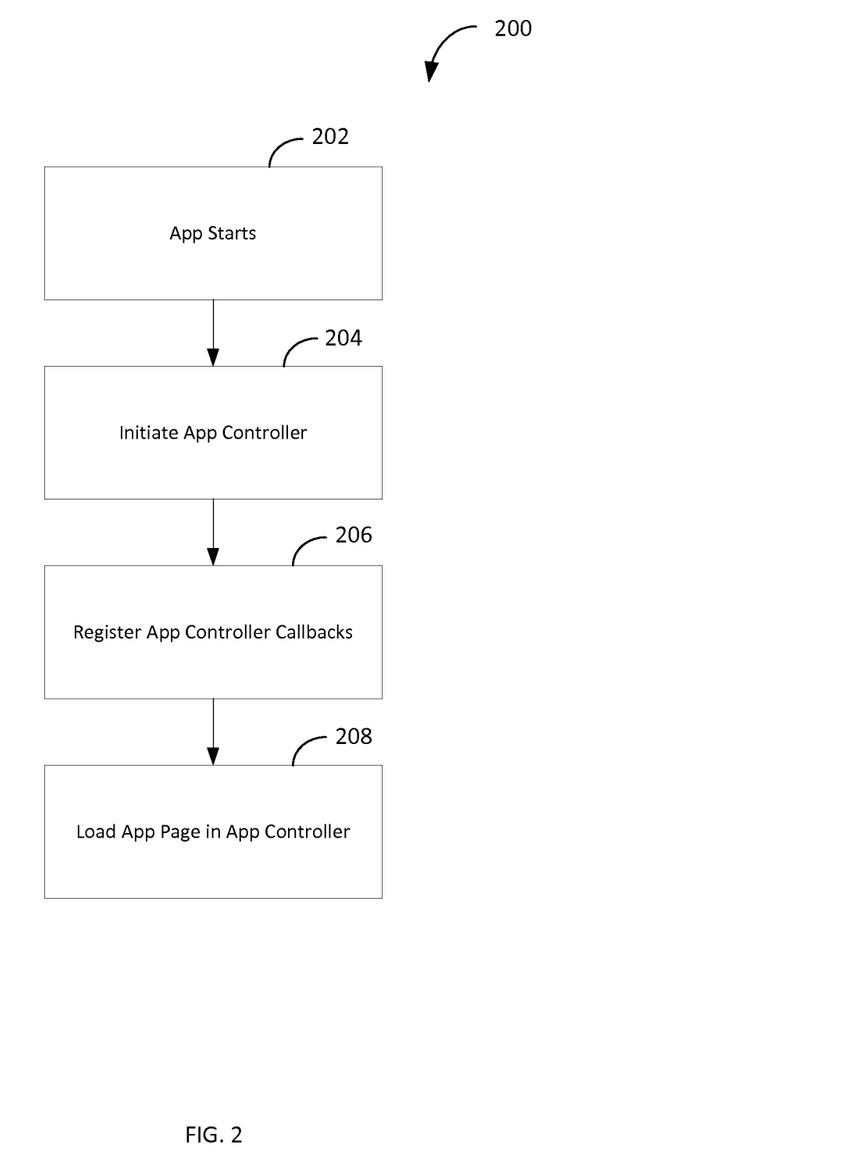
FIG. 2 depicts one embodiment of a flowchart for starting a hybrid mobile application made in accordance with the principles of the present application.

FIG. 2 depicts one embodiment (200) for the how the app controller functions with relationship to the mobile application that may be associated with a remote client application residing on a network or on the Internet or the like. At 202, the mobile user may seek to initiate the mobile application—e.g., by some manner of user command (e.g., touch screen, voice activated, typed text or the like). At 204, the mobile device or the mobile application may initiate the App Controller. The App Controller may initiate a web view controller that may load, display or otherwise show to a user a HTML page and provide functionality to invoke JS methods on the page. At 206, the App Controller may register a plurality of callbacks with the web view controller and/or said remote client application. Finally, at 208, the main content in HTML may be loaded into the App Controller.

Figure 3:
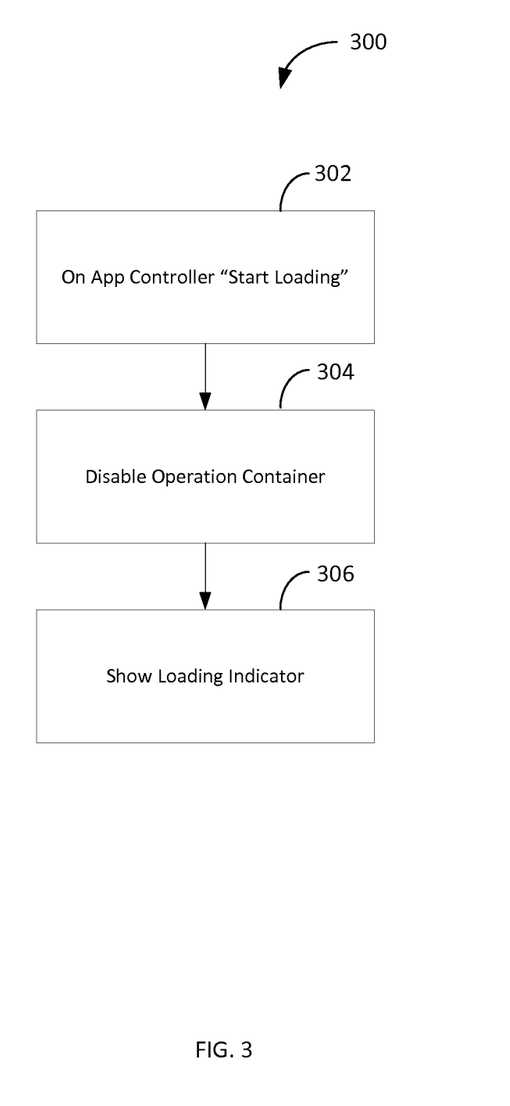
FIG. 3 depicts one embodiment of a flowchart for initially loading a hybrid mobile application.

In one embodiment, the App Controller may initiate a "Start Loading" routine/module at 302 in FIG. 3. Before the mobile application is fully loaded (and successfully loaded), the App Controller may disable the Operations Container at 304. During the time that the mobile application in HTML is loading into the App Controller, a loading indicator may be shown and/or otherwise delivered to the user of the mobile device at 306.

Operation Container

In one embodiment, it may be possible to construct an operation container with a unified look-and-feel. In such an embodiment, it may be possible to have the native part communicate with the HTML parts on several things, for example: (1) what operations are allowed on the current page and (2) the parameters of each operation.

It is possible to have the HTML page host such information above. In addition, it may be possible to have the native part invoke a communication—e.g. "getOperations"—which may return information in some format, e.g., a list of Operation data structure. One such embodiment of an Operation data structure might looks like the following:

| Operation Data Structure |
| --- |
| Operation<br>{<br>    String id;<br>    String title;<br>    String iconUrl;<br>    Version version;<br>    Bool native;<br>    String invokeParameters;<br>} |

In this embodiment, the "native" flag might indicate whether the operation is native implemented logic or it is JavaScript call. If "native" is true, then it is possible to have the native part check whether the operation is supported. Id and version may identify an operation—e.g., it could be an operation like 'pick multiple files and upload'. Such a putative operation may allow the user to pick up multiple photos for device's camera roll and upload to cloud storage. Such an operation may be only done in native SDK on some platforms.

If the operation is supported, the native part may show the operation in the Operation Container using extra information provided by title (e.g., on button or menu in the Operation Container) and iconUrl (e.g., icon file URL of the menu or button). If the operation is not supported, then the operation may be ignored and/or disabled. When the operation is chosen by the user, the App Controller may take the invokeParameters that contains the parameters needed by that operation—e.g., in this example, the upload destination folder—and invoke the native logic.

If "native" is false, the operation may invoke JavaScript method in the HTML page. In such a case, the operation may be shown in the Operation Container. Once the user chooses the operation, the mobile device (e.g., via the App Controller) may invoke the JavaScript method directly encoded in invokeParameters.

Other Embodiments

Figure 4:
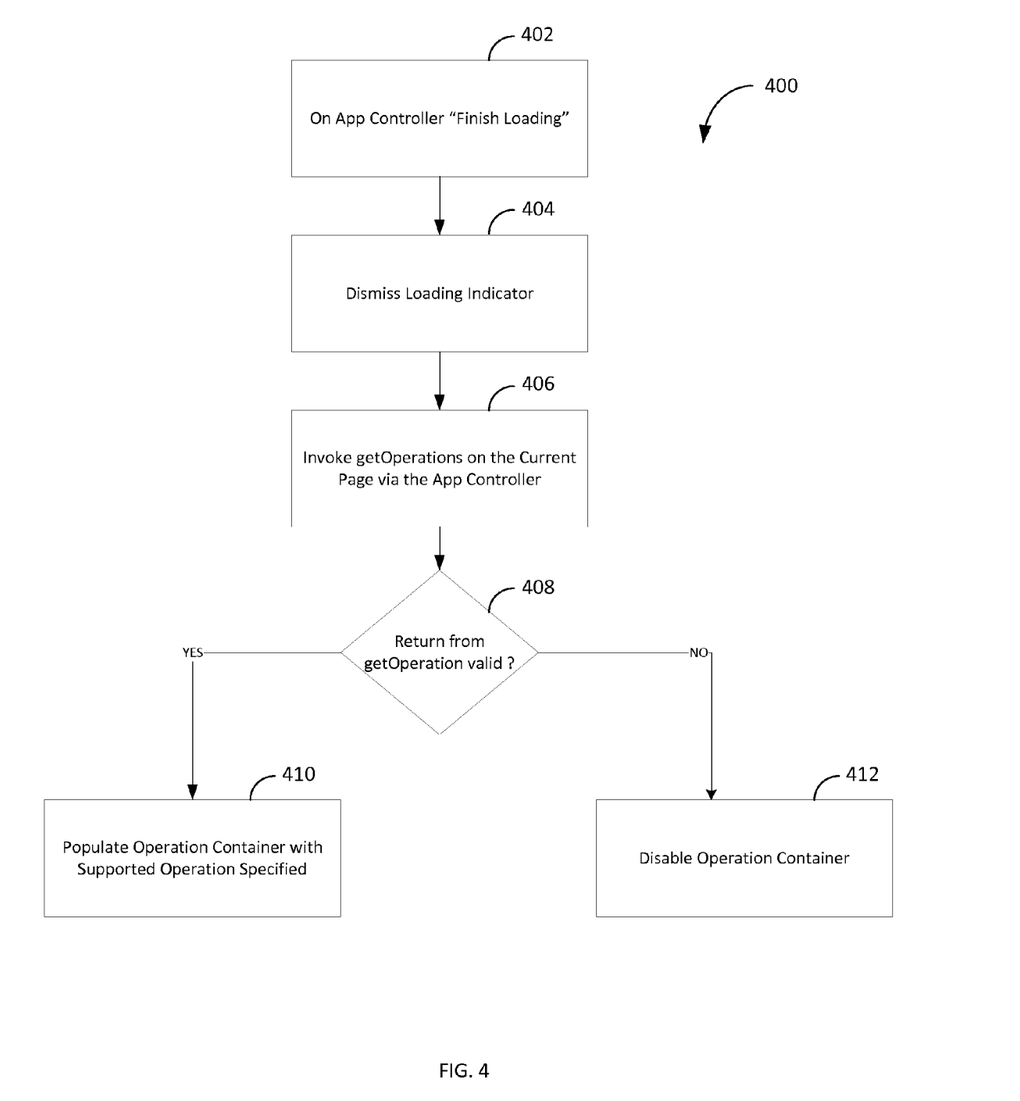
FIG. 4 depicts one embodiment of a flowchart for operating the hybrid mobile application upon final loading onto the mobile device.

FIG. 4 depicts one embodiment of a flowchart for the App Controller upon successful loading of a mobile application. In this flowchart 400, the App Controller may determine a successful loading at 402. The loading indicator may be dismissed and/or deleted at 404 to indicate to the user that the loading is finishing or has finished. At 406, the App Controller may invoke GetOperations on the current mobile application page. The App Controller may monitor a valid return from GetOperation at 408. If the return is valid, then the Operations Container may be populated with the supported operations specified at 410. If the return is not valid, then the App Controller may disable the Operations Container at 412.

Figure 5:
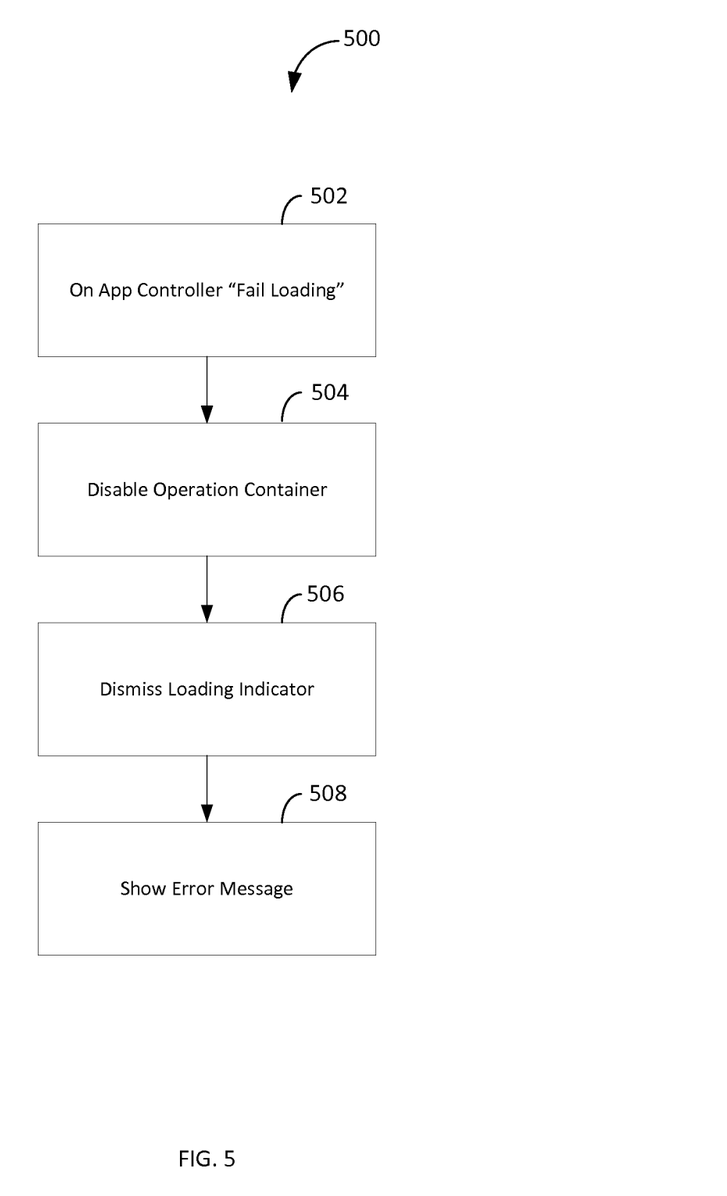
FIG. 5 depicts one embodiment of a flowchart for handling loading errors of hybrid mobile applications onto a mobile device.

FIG. 5 depicts one embodiment of a flowchart for handling failed loadings at 502. App Controller may disable the Operations Container at 504, dismiss the loading indicator at 506 and show an error message to the user at 508.

Figure 6:
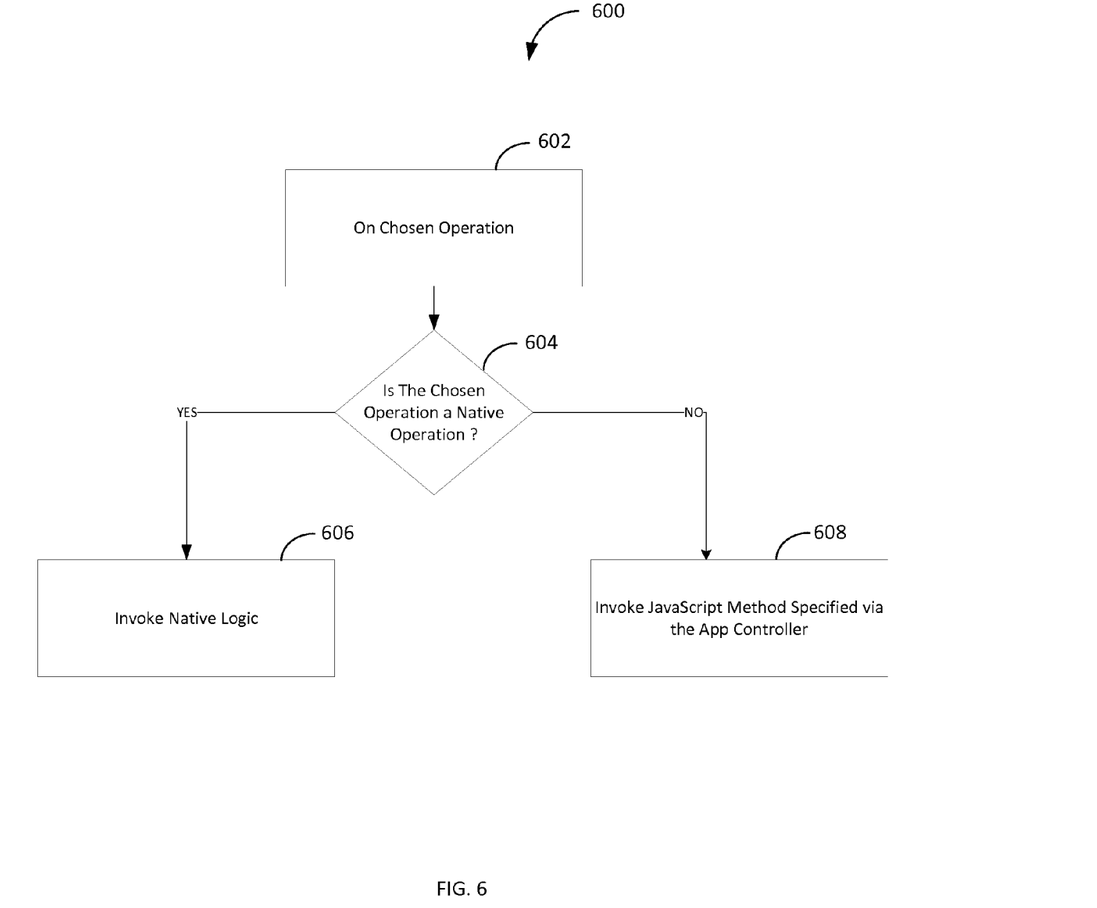
FIG. 6 depicts one embodiment of flowchart for the operation of the mobile devices as the user selects possible operations within the context of a hybrid mobile application.

FIG. 6 depicts one embodiment of a flowchart for executing operations that a user and/or system might select that may be shown or displayed in the Operations Container. At 602, an operation (e.g., in the Operations Container) may be chosen and/or selected by a user or the system. The App Controller may then discern at 604 whether the operation chosen is a "native" operation or not. If the operation is "native", then App Controller may invoke the native logic. Otherwise, the App Controller may invoke the JavaScript method at 608.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A system for hosting a hybrid client application upon a client device, said hybrid client application comprising at least one operation that may be executed as one of a group, said group comprising: a native operation and a call to a remote client application hosted on a remote system, said system comprising:
  a processor;
  a communications module, said communications module configured to communicate with remote client applications, said remote client applications being hosted on said remote system;
  an application controller wherein said application controller configured to communicate with remote client applications via said communications module;
  further wherein said application controller configured to:
  determine whether an operation may be executed as a native operation and as a call to a remote client application;
  check whether the operation is a native operation and is supported;
  disable the native operation upon an indication that the native operation is not supported; and
  upon disabling the native operation, invoke a call to said remote client application.

2. The system of claim 1 wherein said application controller is further configured to access the functionality of said remote client application.

3. The system of claim 2 wherein said application controller is configured to invoke JavaScript functionality from said remote client application.

4. The system of claim 2 wherein said application controller is configured to invoke an operation implemented in native SDK.

5. The system of claim 1 wherein said application controller further comprises a web view controller, said web view controller being configured to load a HTML page associated with said remote client application.

6. The system of claim 5 wherein said application controller is configured to register at least one callback with said web view controller.

7. The system of claim 6 wherein said web view controller is further configured to display said HTML page to a user.

8. The system of claim 7 wherein said web view controller is further configured to invoke JavaScript methods of said HTML page.

9. The system of claim 1 wherein said application controller further comprises an operation container, said operation container further comprising operations buttons, said operation buttons configured to allow a user to launch operations associated with said remote client application.

10. A method for executing a hybrid mobile application upon a mobile device, said mobile device configured to execute native operations created from said mobile devices native SDK, the steps of said method comprising:

upon a user initiation of a mobile application, loading an application controller, said application controller configured to provide a User Interface (UI) for said user that allows access to remote client application functionality and native operation; and upon the user invoking an operation, checking if the operation comprises at least one native operation;

checking if the at least one native operation is supported;

disabling the at least one native operation if the at least one native operation is not supported; and invoking a call to said remote client application.

11. The method of claim 10 wherein the steps of said method further comprise:

loading a HTML web page associated with said remote client application.

12. The method of claim 11 wherein the steps of said method further comprise:

providing a view of said HTML web page associated with said remote client application to said user.

13. The method of claim 12 wherein the steps of said method further comprise:

registering callbacks with said remote client applications with said application controller.

14. The method of claim 12 wherein the steps of said method further comprise:

providing a set of operation buttons for said user, said operation buttons allowing said user to initiate operations associated with said remote client application.

15. The method of claim 14 wherein the steps of said method further comprise:

initiating one of a group of operations upon said user actuating one of said operation buttons.

16. The method of claim 15 wherein the step of initiating one of a group of operations further comprise:

invoking JavaScript on the HTML page associated with said remote client application.

17. The method of claim 15 wherein the step of initiating one of a group of operations further comprise:

invoking a native operation, said native operation implemented in said mobile device's native SDK.

18. A method for providing a User Interface (UI) to a user of a mobile device, said UI allowing said user to access functionality associated with a remote client application, the steps of said method comprising:

providing a UI to said user, said UI further comprising buttons for actuating operations associated with said remote client application;

upon user selection, invoking one of said operations associated with said remote client application wherein said operations further comprises one of a group, said group comprising: remote operations executed by said remote client application and native operations executed by said mobile device; and upon the user selection, checking if the operation comprises at least one native operation;

checking if the at least one native operation is supported;

disabling the at least one native operation if the at least one native operation is not supported; and invoking a call to said remote client application.

19. The method of claim 18 wherein the step of invoking one of said operations further comprises the steps of:

determining the operations that are allowed for said remote client application;

determining the parameters of each said operation;

returning a communication to said UI said parameters of said operation invoked by said user.

20. The method of claim 19 wherein the step of returning a communication further comprises:

returning an indication whether said operation invoked by said user is one of a group, said group comprising: a JavaScript operation provided by said remote client application and a native operation provided by said mobile device.

\* \* \* \* \*